(12) United States Patent
Ukai et al.

(10) Patent No.: US 9,099,709 B2
(45) Date of Patent: Aug. 4, 2015

(54) FUEL CELL POWER GENERATION SYSTEM, AND METHOD FOR OPERATING FUEL CELL POWER GENERATION SYSTEM

(75) Inventors: Kunihiro Ukai, Nara (JP); Yukimune Kani, Osaka (JP); Hiroaki Kaneko, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 492 days.

(21) Appl. No.: 12/671,766

(22) PCT Filed: Jun. 4, 2009

(86) PCT No.: PCT/JP2009/002534
§ 371 (c)(1),
(2), (4) Date: Feb. 2, 2010

(87) PCT Pub. No.: WO2009/147859
PCT Pub. Date: Dec. 10, 2009

(65) Prior Publication Data
US 2011/0229778 A1 Sep. 22, 2011

(30) Foreign Application Priority Data
Jun. 4, 2008 (JP) ................................. 2008-146412

(51) Int. Cl.
*H01M 8/06* (2006.01)
*C01B 3/38* (2006.01)
(Continued)

(52) U.S. Cl.
CPC ............... *H01M 8/0618* (2013.01); *C01B 3/38* (2013.01); *C01B 3/48* (2013.01); *H01M 8/04089* (2013.01);
(Continued)

(58) Field of Classification Search
CPC .......... H01M 8/04089; H01M 8/0618; H01M 8/04425; H01M 8/0662
See application file for complete search history.

(56) References Cited

U.S. PATENT DOCUMENTS 6,579,347 B1 6/2003 Wakita et al.
2004/0013917 A1* 1/2004 Ukai et al. ...................... 429/19
(Continued)

FOREIGN PATENT DOCUMENTS

EP 2187471 * 5/2010 .............. H01M 8/06
GB 2 259 871 A 3/1993
(Continued)

OTHER PUBLICATIONS

Supplementary Partial European Search Report for related European Application No. EP08790137.7 dated Oct. 21, 2011.
(Continued)

*Primary Examiner* — Barbara Gilliam
*Assistant Examiner* — Angela Martin
(74) *Attorney, Agent, or Firm* — Renner, Otto, Boisselle & Sklar, LLP

(57) ABSTRACT

A fuel cell power generation system 100 for performing power generation using hydrogen-containing gas generated from a raw material containing a hydrocarbon component and an odorizer component includes a raw material supply section 4 for controlling a flow rate of the raw material; a water supply section 3 for supplying water; an adsorptive removal section 5 for causing the raw material to pass therethrough and adsorbing the odorizer component contained in the raw material; a reformer 1 for generating the hydrogen-containing gas by a reforming reaction of the raw material which has passed the adsorptive removal section and water supplied from the water supply section; a fuel cell 8 for performing power generation using the hydrogen-containing gas as a fuel; and an operating control section for, as an accumulated flow volume of the raw material supplied to the adsorptive removal section 5 from the raw material supply section 4 increases, decreasing the flow rate of the raw material to be supplied to the adsorptive removal section 5 from the raw material supply section 4, the flow rate being set with respect to an amount of power to be generated by the fuel cell 8.

10 Claims, 3 Drawing Sheets

(51) Int. Cl.
*C01B 3/48* (2006.01)
*H01M 8/04* (2006.01)

(52) U.S. Cl.
CPC ...... *H01M 8/04425* (2013.01); *H01M 8/04619* (2013.01); *H01M 8/04753* (2013.01); *H01M 8/04776* (2013.01); *H01M 8/0662* (2013.01); *C01B 2203/0233* (2013.01); *C01B 2203/0283* (2013.01); *C01B 2203/066* (2013.01); *C01B 2203/1258* (2013.01); *C01B 2203/16* (2013.01); *Y02E 60/50* (2013.01)

(56) References Cited

U.S. PATENT DOCUMENTS

| | | | |
|---|---|---|---|
| 2004/0229092 A1* | 11/2004 | Take | 429/19 |
| 2004/0241509 A1* | 12/2004 | Taguchi et al. | 429/19 |
| 2007/0093385 A1 | 4/2007 | Kim et al. | |
| 2007/0104983 A1* | 5/2007 | Wakita et al. | 429/19 |
| 2010/0203406 A1* | 8/2010 | Kani et al. | 429/423 |

FOREIGN PATENT DOCUMENTS

| | | |
|---|---|---|
| JP | 09-320622 | 12/1997 |
| JP | 10-237473 | 9/1998 |
| JP | 11-309329 | 11/1999 |
| JP | 2002-358992 | 12/2002 |
| JP | 2003-243005 | 8/2003 |
| JP | 2004-228016 | 8/2004 |
| JP | 2006-008459 | 1/2006 |
| JP | 2006-137649 | 6/2006 |
| JP | 2006-278120 | 10/2006 |
| JP | 2006-286279 | 10/2006 |
| JP | 2007-123269 | 5/2007 |
| JP | 2007-141857 | 6/2007 |
| JP | 2007-194142 | 8/2007 |
| JP | 2008-074674 | 4/2008 |
| WO | 2007/091632 A1 | 8/2007 |
| WO | 2007/148699 A1 | 12/2007 |
| WO | 2009/004803 A1 | 1/2009 |
| WO | 2009/031271 A1 | 3/2009 |
| WO | WO 2009031271 * | 3/2009 ............ H01M 8/04 |

OTHER PUBLICATIONS

Supplementary European Search Report for related European Application No. EP08790494.2 dated Oct. 12, 2011.
International Search Report for Application No. PCT/JP2008/002290 mailed Nov. 25, 2008.
International Search Report for Application No. PCT/JP2008/001738 mailed Sep. 30, 2008.
Co-pending U.S. Appl. No. 12/665,152 submitted on Dec. 17, 2009 (application provided).
Co-pending U.S. Appl. No. 12/676,456 submitted on Mar. 4, 2010 (application provided).
International Search Report for corresponding application No. PCT/JP2009/002534 dated Sep. 8, 2009.
Extended European Search Report for corresponding European Patent Application No. 09758126.8 dated Apr. 3, 2013.

* cited by examiner

FUEL CELL POWER GENERATION SYSTEM, AND METHOD FOR OPERATING FUEL CELL POWER GENERATION SYSTEM

TECHNICAL FIELD

The present invention relates to a fuel cell power generation system including a hydrogen generation apparatus for generating hydrogen-containing gas from fossil fuel or the like, and a method for driving the same.

BACKGROUND ART

Fuel cells capable of performing power generation at a high efficiency even with a small size are being progressively developed as a key component of a power generation system for a distributed energy supply source. A supply system of hydrogen gas, which is a fuel necessary for power generation, is not sufficiently provided as a general infrastructure. Therefore, a hydrogen generation apparatus for generating hydrogen-containing gas using a raw material supplied from an existing fossil fuel infrastructure for, for example, city gas, propane gas or the like is installed together with the fuel cell power generation system.

City gas, propane gas or the like which is supplied from an existing infrastructure usually contains an odorizer component represented by a sulfur compound such as $CH_3SCH_3$, $(CH_3)_3CSH$ or the like generally at a volume concentration of about several ppm's. Such an odorizer component is added in order to detect a gas leak from a pipe or the like of the infrastructure line. However, a sulfur compound contained as such an odorizer component poisons a catalyst used in the hydrogen generation apparatus. Accordingly, in order to suppress the poisoning influence of sulfur on the catalyst, the sulfur compound needs to be removed from the raw material such as city gas, propane gas or the like before the raw material is supplied to the hydrogen generation apparatus.

Patent Document No. 1 proposes, in order to remove a sulfur compound from a raw material, adsorbing and thus removing the sulfur compound in the raw material by an adsorptive removal section using an zeolite-based adsorptive removal agent.

With the adsorptive removal section using an zeolite-based adsorptive removal agent, the adsorbing capacity on a sulfur compound is small. In order to sufficiently suppress the poisoning influence of sulfur on the catalyst used in the hydrogen generation apparatus, the adsorptive removal section needs to be exchanged every certain time period. For example, Patent Document No. 2 filed by the present Applicant describes adopting an adsorptive removal section detachable from a power generation system using a fuel cell (fuel cell power generation system) and proposes determining the time to exchange the adsorptive removal section based on an accumulated amount of the raw material gas which has passed the section. Patent Document No. 3 proposes a method of networking a plurality of fuel cell power generation systems installed at houses and facilities to determine the time to exchange the adsorptive removal section.

CITATION LIST

Patent Literature

Patent Document No. 1: Japanese Laid-Open Patent Publication No. 2004-228016
Patent Document No. 2: Japanese Laid-Open Patent Publication No. 2006-8459
Patent Document No. 3: Japanese Laid-Open Patent Publication No. 2006-278120

SUMMARY OF INVENTION

Technical Problem

When a raw material, such as propane gas, city gas or the like, containing an organic compound formed of at least chemical elements of carbon and hydrogen and an odorizer component (hereinafter, also referred to simply as the "raw material") is caused to pass an adsorptive removal section using an adsorptive removal agent, for example, a zeolite-based adsorptive removal agent adsorbs a hydrocarbon component in addition to a sulfur component (including a sulfur compound) in the raw material. Especially, the adsorbing ratio, on the hydrocarbon component, of a fresh adsorptive removal section which has been passed by almost no raw material is high. However, when the amount of the hydrocarbon component adsorbed by the adsorptive removal section reaches a prescribed amount (saturated adsorption amount), the adsorptive removal section adsorbs almost no more hydrocarbon component. Therefore, as the accumulated flow volume of the raw material which has passed the adsorptive removal section (flow volume) increases, the adsorbing ratio on the hydrocarbon component decreases. Accordingly, where the target flow rate of the raw material is set with respect to an amount of power to be generated by the fuel cell in accordance with the high adsorbing ratio on the hydrocarbon component which is obtained when the system is driven immediately after a fresh adsorptive removal section (adsorptive removal agent) starts to be used, and the system is continuously driven while keeping such a flow rate, the following occurs. As the accumulated amount of the raw material supplied to the adsorptive removal section increases, the flow rate of the raw material supplied to the hydrogen generation apparatus becomes excessive for the amount of power to be generated by the fuel cell. Namely, as the accumulated amount of the raw material supplied to the adsorptive removal section increases, an excessively large amount of hydrogen for the amount of power to be generated by the fuel cell is supplied. This wastes energy.

The present invention made in light of the above-described circumstances has an object of providing a fuel cell power generation system including an adsorptive removal section, which, even where the adsorptive removal section is fresh, suppresses the flow rate of the raw material to be supplied to a hydrogen generation apparatus from becoming excessive even when the accumulated amount of the raw material supplied to the adsorptive removal section increases.

Solution to Problem

A fuel cell power generation system according to the present invention is for performing power generation using hydrogen-containing gas generated from a raw material containing a hydrocarbon component and an odorizer component, and includes a raw material supply section for controlling a flow rate of the raw material; a water supply section for supplying water; an adsorptive removal section for causing the raw material to pass therethrough and adsorbing the odorizer component contained in the raw material; a reformer for generating the hydrogen-containing gas by a reforming reaction of the raw material which has passed the adsorptive removal section and water supplied from the water supply section; a fuel cell for performing power generation using the hydrogen-containing gas as a fuel; and an operating control section for, as an accumulated flow volume of the raw material supplied to the adsorptive removal section from the raw material supply section increases, decreasing the flow rate of the raw material to be supplied to the adsorptive removal section from the raw material supply section, the flow rate being set with respect to an amount of power to be generated by the fuel cell.

In a preferable embodiment, the fuel cell power generation system further includes an accumulated flow volume measuring section for measuring the accumulated flow volume of the raw material; wherein the operating control section decreases the flow rate of the raw material which is set with respect to the amount of power to be generated by the fuel cell as the accumulated flow volume of the raw material measured by the accumulated flow volume measuring section increases.

In a preferable embodiment, the fuel cell power generation system further includes an accumulated power amount measuring section for measuring an accumulated amount of power generated by the fuel cell; wherein the operating control section decreases the flow rate of the raw material which is set with respect to the amount of power to be generated by the fuel cell as the accumulated amount of power generated by the fuel cell measured by the accumulated power amount measuring section increases.

In a preferable embodiment, the operating control section decreases, stepwise, the flow rate of the raw material which is set with respect to the amount of power to be generated by the fuel cell.

In a preferable embodiment, an amount by which the flow rate of the raw material is to be decreased is defined based on adsorption characteristics of the adsorptive removal section on the hydrocarbon component.

The adsorptive removal section may have an adsorptive removal agent containing zeolite as a main component.

A method for driving a fuel cell power generation system according to the present invention is a method for driving a fuel cell power generation system for performing power generation using hydrogen-containing gas generated from a raw material containing a hydrocarbon component and an odorizer component. The fuel cell power generation system includes a raw material supply section for controlling a flow rate of the raw material; a water supply section for supplying water; an adsorptive removal section for causing the raw material to pass therethrough and adsorbing the odorizer component contained in the raw material; a reformer for generating the hydrogen-containing gas by a reforming reaction of the raw material which has passed the adsorptive removal section and water supplied from the water supply section; and a fuel cell for performing power generation using the hydrogen-containing gas as a fuel. As an accumulated flow volume of the raw material supplied to the adsorptive removal section from the raw material supply section increases, the flow rate of the raw material to be supplied to the adsorptive removal section from the raw material supply section is decreased, the flow rate being set with respect to an amount of power to be generated by the fuel cell.

In a preferable embodiment, as an operating time of the fuel cell power generation system passes, the flow rate of the raw material which is set with respect to the amount of power to be generated by the fuel cell is decreased.

In a preferable embodiment, as an accumulated amount of power generated by the fuel cell increases, the flow rate of the raw material which is set with respect to the amount of power to be generated by the fuel cell is decreased.

In a preferable embodiment, the flow rate of the raw material which is set with respect to the amount of power to be generated by the fuel cell is decreased stepwise.

In a preferable embodiment, an amount by which the flow rate of the raw material is to be decreased is defined based on adsorption characteristics of the adsorptive removal section on the hydrocarbon component.

Advantageous Effects of Invention

According to the present invention, where a fresh adsorptive removal section which has been passed by almost no raw material is used, the flow rate of the raw material to be supplied to the hydrogen generation apparatus is suppressed from becoming excessive even when the accumulated amount of the raw material supplied to the adsorptive removal section increases. This improves the energy saving characteristic.

DESCRIPTION OF EMBODIMENTS

The present inventors measured adsorption characteristics of an adsorptive removal section on a hydrocarbon component. The method and measurement results will be described.

The measurement was carried out using a fresh adsorptive removal section filled with a zeolite-based adsorbing desulfurization agent which had not contacted the raw material almost at all. The amount of the adsorbing desulfurization agent to be put in the adsorptive removal section was 400 g (weight in a dried state). As the raw material which is to pass the adsorptive removal section, city gas 13A supplied from a gas infrastructure line 6 of Osaka Gas Co., Ltd. was used. Table 1 shows the composition of 13A of Osaka Gas Co., Ltd. used in this measurement (refer to MSDS provided by Osaka Gas Co., Ltd.).

TABLE 1

| Component | Volume % |
| --- | --- |
| Methane | 88.9 |
| Ethane | 6.8 |
| Propane | 3.1 |
| Butane | 1.2 |

This adsorptive removal section was set in a hydrogen generation apparatus, and a raw material caused to pass the adsorptive removal section was supplied to a reformer of the hydrogen generation apparatus. In the reformer, hydrogen-containing gas was generated by a reforming reaction of the raw material and water. The generated hydrogen-containing gas was supplied to the fuel cell to perform power generation. The target value of power generation by the fuel cell was set to 1 kW (for the generation of 1 kW), and the above-described raw material was distributed in the adsorptive removal section at 4 NL/min. (0° C.; converted into the value at 1 atmospheric pressure), which is the usual flow rate of 13A. At this point, the flow rate of the raw material before the raw material passes the adsorptive removal section (entrance-side flow rate) and the flow rate of the raw material after the raw material passes the adsorptive removal section (exit-side flow rate) were measured, and the ratio of the exit-side flow rate with respect to the entrance-side flow rate (hereinafter, referred to simply as the "flow rate ratio") was found.

Figure 1:
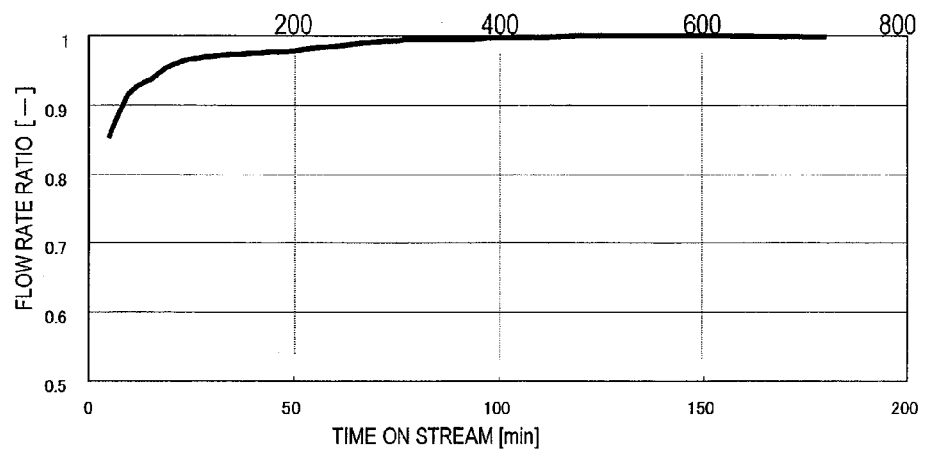
FIG. 1 is a graph showing a change of the flow rate ratio between at an entrance and at an exit of a fresh adsorptive removal section.

The measurement results are shown in FIG. 1. FIG. 1 is a graph showing a change of the flow rate ratio with respect to the time on stream or the flow volume of the raw material (accumulated flow volume). As understood from the results, when the system starts to be driven immediately after the adsorptive removal section is exchanged, a part of the hydrocarbon component in the raw material is adsorbed by the adsorptive removal section, and thus the flow rate of the raw material after the raw material passes the adsorptive removal section (exit-side flow rate) is decreased from the flow rate of the raw material before the raw material passes the adsorptive removal section (entrance-side flow rate). Therefore, the flow rate ratio (exit-side flow rate/entrance-side flow rate) is lower than 1. In the hydrogen generation apparatus, the raw material which has passed the adsorptive removal section and water are supplied to the reformer including a steam reforming section, and hydrogen-containing gas is generated in the reformer. Accordingly, when the flow rate ratio is lower than 1, the amount of the hydrogen-containing gas generated in the reformer is smaller than the amount in the case where the hydrocarbon component is not adsorbed (flow rate ratio=1).

As shown in FIG. 1, as the accumulated flow volume of the raw material which has passed the adsorptive removal section increases, the flow rate ratio gradually becomes closer to 1. This means that as the accumulated flow volume of the raw material increases, the amount of the hydrocarbon component in the raw material which is adsorbed by the adsorptive removal section gradually decreases. When the accumulated flow volume further increases and reaches a prescribed amount, the flow rate ratio becomes about 1. This is considered to occur because the amount of the hydrocarbon component adsorbed by the adsorptive removal section saturates. In this specification, the accumulated flow volume necessary to saturate such an adsorbed amount of the hydrocarbon component is referred to as the "flow volume for saturation adsorption". From the above measurement results, it is understood that the flow volume for saturation adsorption of the adsorptive removal section used here is, for example, about 700 L.

Next, the present inventors performed qualitative and quantitative analyses on the raw material which has passed the adsorptive removal section. The adsorptive removal section used was substantially the same as that used in the above-described measurement. The method and results of the analyses will be described.

First, an analysis was made on the raw material which had not yet passed the adsorptive removal section (pre-desulfurization raw material sample) N0. Then, the raw material was caused to pass the adsorptive removal section at substantially the same flow rate as that described above. Each time when the accumulated flow volume of the raw material which passed the adsorptive removal section reached 240 L, 480 L and 720 L, an analysis was made on each raw material which passed the adsorptive removal section (pre-desulfurization raw material sample) N1, N2, N3. The quantitative analysis on the pre-desulfurization raw material sample N0 and the post-desulfurization raw material samples N1 through N3 was made using gas chromatography after sampling the raw materials. The analysis on the components of these raw material samples (qualitative analysis) was made by substantially the same method as inflammable gas component analysis of city gas generally used, and so the method will not be described.

Figure 2:
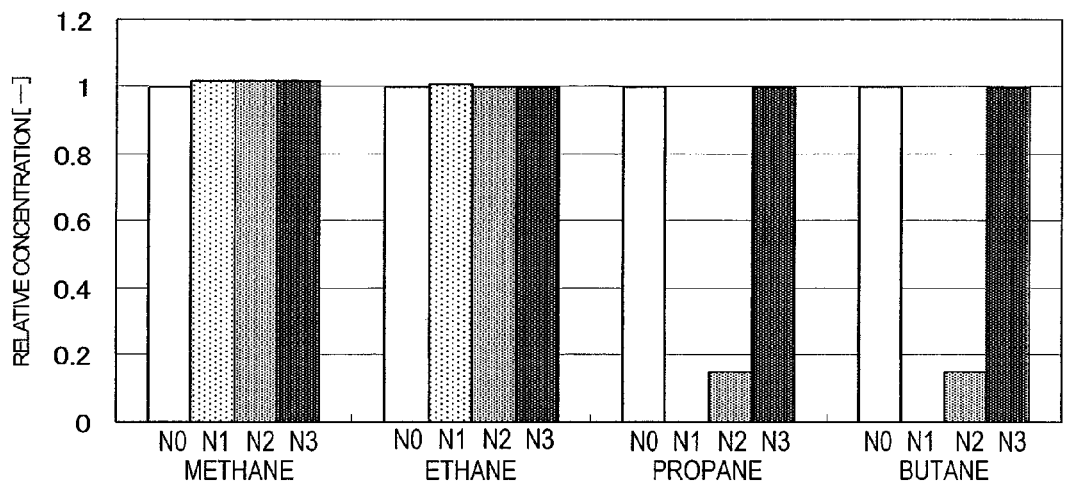
FIG. 2 is a graph showing the composition of a raw material before and after the raw material passes the fresh adsorptive removal section.
Figure 3:
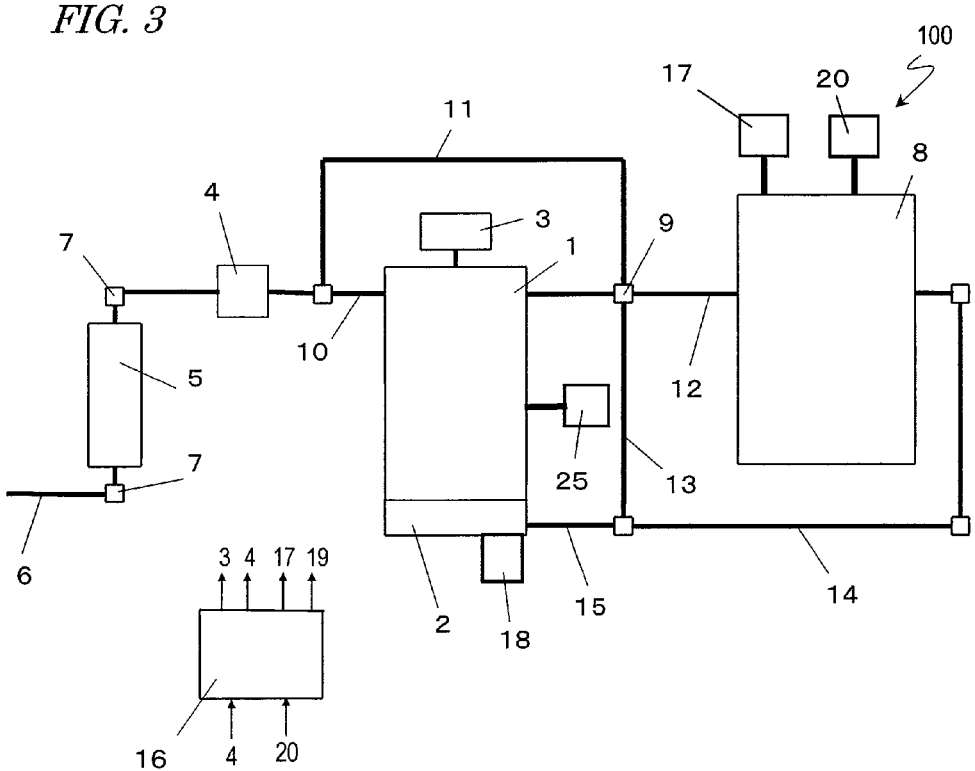
FIG. 3 shows a structure of a fuel cell power generation system according to the present invention.

The analysis results are shown in FIG. 2. FIG. 2 is a graph showing relative concentrations of each of the hydrocarbon components (methane, ethane, propane and butane) contained in the pre-desulfurization raw material sample N0 and the post-desulfurization raw material samples N1 through N3. The "relative concentration" is a ratio of the concentration of each of the hydrocarbon components contained in each raw material sample with respect to the concentration of the respective hydrocarbon component contained in the pre-desulfurization raw material sample N0.

From the measurement results shown in FIG. 2, it is understood that the adsorption of methane, which is a main component of city gas, is saturated immediately after the raw material starts passing the adsorptive removal section, whereas the adsorption of propane and butane, which have a higher boiling point than methane, is saturated after a certain amount of the raw material passes the adsorptive removal section and thus the adsorption of methane is saturated.

By comparing the results of the two measurements described above (FIG. 1 and FIG. 2), the following is confirmed. When the raw material passes the adsorptive removal section until the accumulated flow volume reaches 240 L, as shown in FIG. 1, the gas flow ratio is about 0.96 (data with the time on stream of 60 min.). This indicates that about 4% of the raw material of the amount before the raw material passes the adsorptive removal section is adsorbed. By contrast, when the accumulated flow volume reaches 240 L, as shown in FIG. 2, almost all the amounts of propane and butane in the raw material are adsorbed by the adsorptive removal section. As shown in Table 1, a sum of the components of propane and butane is 4.3% on the volume basis. Therefore, it is understood that when the accumulated flow volume reaches 240 L, almost all the amounts of propane and butane in the raw material are adsorbed by the adsorptive removal section, and the flow rate of the raw material is decreased by the corresponding volume. Thus, the measurement results shown in FIG. 1 and FIG. 2 match Table 1 showing the ratios of components.

As described above, in the case where a fresh adsorptive removal section is set in the hydrogen generation apparatus, when the hydrogen generation apparatus starts to be driven, a part of the hydrocarbon component in the raw material is adsorbed by the adsorptive removal section. Therefore, the flow rate of the raw material N1 after the raw material passes the adsorptive removal section is lower than the flow rate of the raw material N0 before the raw material passes the adsorptive removal section. When more raw material passes the adsorptive removal section, the adsorbed amounts of the hydrocarbon components are saturated in the order from an adsorbed amount of a hydrocarbon component having a lower boiling point. Thus, as shown in FIG. 1, the adsorbed amount decreases and the flow rate ratio approaches 1. However, the components having 2 or more carbon atoms (ethane, propane, butane) each generate a larger amount of hydrogen than methane for the same volume. Therefore, when such a component is adsorbed, the generation amount of hydrogen-containing gas decreases by equal to or more than the volume decreased by the adsorption. For example, where the accumulated flow volume is 240 L, the volume of the raw material decreases by about 4% as described above. This corresponds to a decrease of about 10% when being converted on the volume basis to the amount of hydrogen gas which can be generated. Accordingly, where the amount of power to be generated is set based on the initial flow rate of the raw material before the raw material passes the adsorptive removal section and the system is continuously driven to perform power generation while keeping the set value, the amount of hydrogen required by the fuel cell becomes larger than the actual generation amount of hydrogen. As a result, as understood from this, the power generation state becomes unstable, or the amount of hydrogen off-gas supplied to a combustion section of the hydrogen generation apparatus increases and so an amount of heat more than necessary is supplied for the reforming reaction.

The present invention is made based on the above-described measurement results and the analysis results. According to the present invention, the flow rate of the raw material to be supplied from outside to the fuel cell power generation system is set such that an amount of hydrogen required for the amount of power to be generated by the fuel cell is obtained, in consideration of the amount of the hydrocarbon component contained in the raw material which will be adsorbed by the adsorptive removal section. After the fuel cell starts to be driven, the raw material flow rate which is set with respect to the amount of power to be generated by the fuel cell is decreased as the accumulated flow volume of the raw material supplied to the adsorptive removal section from the raw material supply section increases. Owing to this, even where a fresh adsorptive removal section is used, an amount of hydrogen-containing gas which is optimal for the power to be generated can be certainly supplied from the reformer to the fuel cell.

A fuel cell power generation system in a preferable embodiment of the present invention performs power generation using, as a fuel, hydrogen-containing gas generated using a raw material containing a hydrocarbon component. The raw material contains an odorizer component. For removing the odorizer component, an adsorptive removal section is used. It is preferable that the adsorptive removal section has an adsorbing desulfurization agent containing zeolite as a main component. A zeolite-based adsorbing desulfurization agent allows desulfurization to be performed at room temperature and is easy to handle. This fuel cell power generation system includes a raw material supply section for controlling a flow rate of the raw material to be supplied from outside, a water supply section for supplying water, a reformer for generating the hydrogen-containing gas by a reforming reaction of the raw material and water, and a fuel cell. In this embodiment, as the accumulated flow volume of the raw material supplied to the adsorptive removal section from the raw material supply section increases, the flow rate which is set with respect to the amount of power to be generated by the fuel cell is decreased from the initially set flow rate. The "accumulated flow volume of the raw material" means an accumulated amount of the raw material supplied to a fresh adsorptive removal section after the raw material starts to be supplied thereto. Accordingly, even where the system is stopped and restarted in repetition, the accumulated flow volume is not reset but is added as long as the same adsorptive removal section is used.

The "raw material flow rate" which is set with respect to the amount of power to be generated by the fuel cell in the fuel cell power generation system in this embodiment is appropriately set in accordance with the target value of power generation. For example, when the target value of power generation is 1 kW (also referred to as "for the generation of 1 kW"), such a set value is the raw material flow rate necessary to obtain an output of 1 kW (for example, 4 NL/min.) and is set based on the amount of hydrogen to be generated by the hydrogen generation apparatus and the amount of power to be generated by the fuel cell.

According to the above-described fuel cell power generation system, when the system is driven using a fresh adsorptive removal section, the flow rate of the raw material which is to pass the adsorptive removal section is decreased as the flow rate of the raw material accumulated after the raw material starts to be supplied to the adsorptive removal section from the raw material supply section increases, for a certain time period after the start of the raw material supply to the adsorptive removal section, namely, for a time period in which the adsorptive removal section adsorbs an unignorable amount of hydrocarbon component other than the odorizer component. For example, when the system starts to be driven for the first time, the raw material flow rate is set to the initial value preset in accordance with the amount of power to be generated. After this, as the accumulated flow volume increases, the raw material flow rate set with respect to the amount of power to be generated is decreased. Such a manner of driving performed while decreasing the target value of the raw material flow rate with respect to the amount of power to be generated by the fuel cell is continued until the accumulated flow volume of the raw material supplied to the adsorptive removal section reaches the preset amount (prescribed accumulated flow volume). After the accumulated flow volume of the amount supplied to the adsorptive removal section reaches the prescribed accumulated flow volume, it is not necessary to decrease the raw material flow rate in consideration of the adsorption characteristics of the adsorptive removal section on the hydrocarbon component. Owing to this, during the driving in the initial period performed using a fresh adsorptive removal section (initial period after the start of driving), the raw material can be supplied in an amount suitable for the amount to be adsorbed, and so an amount of hydrogen-containing gas required by the fuel cell for the power generation can be obtained with certainty. In a situation where the amount of the hydrogen-containing gas becomes excessive and the adsorbed amount of the raw material decreases as the amount of the raw material which has passed the adsorptive removal section increases, the raw material flow rate is decreased; and after the adsorbed amount of the raw material is saturated, the decrease of the raw material flow rate is stopped. In this manner, an appropriate amount of the hydrogen-containing gas can be supplied to the fuel cell, and so efficient driving with effective use of energy can be performed. In addition, an increase of the steam-to-carbon ratio and the decrease of the generation amount of the hydrogen-containing gas due to the adsorption of the hydrocarbon component by the adsorptive removal section can be suppressed, and so the reformer can be driven stably.

Preferably, the "prescribed accumulated flow volume" is set based on the flow volume of the raw material (flow volume for saturation adsorption) necessary to saturate the adsorbed amount of the hydrocarbon component. The flow volume for saturation adsorption varies in accordance with the type or amount of the adsorbing agent included in the adsorptive removal section, and therefore can be found in advance by measuring the adsorbing ratio of the adsorptive removal section to be used on the hydrocarbon component contained in the raw material. The adsorbing ratio on the hydrocarbon component can be obtained by substantially the same method as described above, namely, by finding the relationship of the flow volume of the raw material to the adsorptive removal section with the ratio of the exit-side flow rate with respect to the entrance-side flow rate of the adsorptive removal section (flow rate ratio). Specifically, the adsorbing ratio is calculated by the adsorbing ratio (%)=(1−(entrance-side flow rate of the raw material/exit-side flow rate of the raw material))×100. A change of the adsorbing ratio with respect to the accumulated flow volume of the raw material supplied to the adsorptive removal section is defined as the adsorption characteristics of the adsorptive removal section on the hydrocarbon component in the raw material.

In the fuel cell power generation system in this embodiment, as described above, as the accumulated flow volume of the raw material supplied to the adsorptive removal section from the raw material supply section increases, the flow rate which is set with respect to the amount of power to be generated by the fuel cell is decreased from the initially set flow rate. The "increase of the accumulated flow volume of the raw material" has both of the following two meanings: by a direct meaning, this expression means an increase of the accumulated flow volume of the raw material itself, and by an indirect meaning, this expression means an increase of a physical amount (for example, the accumulated operating time of the fuel cell power generation system, the accumulated amount of power generated by the fuel cell, etc.) correlating to (changing in proportion to) the accumulated flow volume of the raw material.

Specifically, the fuel cell power generation system may include an operating control section for driving the system while measuring the operating time thereof (accumulated operating time period) or the accumulated amount of power generated by the fuel cell, and adjusting the raw material flow rate which is set with respect to the amount of power to be generated by the fuel cell based on the measured value. Also regarding the operating time of the fuel cell power generation system (accumulated operating time period) or the accumulated amount of power generated by the fuel cell, the accumulated value is not reset but is added as long as the same adsorptive removal section is used even where the system is stopped and restarted in repetition, like in the case of the accumulated flow volume of the raw material. In this case, the adsorption characteristics is defined as the change of the adsorbing ratio with respect to the operating time of the fuel cell power generation system or as the change of the adsorbing ratio with respect to the accumulated amount of power generated by the fuel cell. The relationship of the operating time, the accumulated flow volume or the accumulated amount of power generation with the amount (or the ratio) by which the raw material flow rate is to be decreased may be organized in the form of a table based on the adsorption characteristics of the adsorptive removal section to be used on the hydrocarbon component, and input in advance to the operating control section.

Hereinafter, embodiments of the present invention will be described more specifically with reference to the drawings.

Embodiment 1

Structure of a Fuel Cell Power Generation System

A fuel cell power generation system 100 includes a reformer 1 for generating hydrogen-containing gas, a fuel cell 8 for performing power generation using the hydrogen-containing gas supplied from the reformer 1, a hydrogen gas supply path 12 for supplying hydrogen gas from the reformer 1 to the fuel cell 8, an off-gas path 14 for supplying anode off-gas discharged by the fuel cell 8 to a combustion section 2 of the reformer 1, and a combustion gas supply path 15. The hydrogen gas supply path 12 is provided with a closing section 9 for stopping the supply of the hydrogen-containing gas from the reformer 1. The closing section 9 is connected to a reformer bypass path 11 and a fuel cell bypass path 13. Owing to a combination of a plurality of electromagnetic valves (not described in detail), the fuel cell power generation system 100 also has a function of switching the path for distributing gas through the hydrogen gas supply path 12 or through the reformer bypass path 11. The fuel cell 8 includes a fuel cell air blower 17 for supplying air as oxygen-containing gas and a power detection section 20 for detecting an amount of power generated by the fuel cell 8. The remaining part of the fuel cell power generation system 100 is substantially the same as the structure of a general solid-state polymer-type fuel cell and will not be described in detail.

The reformer 1 is connected to an adsorptive removal section 5 for causing a hydrocarbon-based raw material containing a sulfur component to pass therethrough and adsorbing the sulfur component contained in the raw material, a raw material supply section 4 for controlling the flow rate of the raw material (raw material flow rate) to be supplied to the adsorptive removal section 5, and a water supply section 3 for supplying water.

The reformer 1 in this embodiment generates hydrogen-containing gas using the raw material which has passed the adsorptive removal section 5 and water supplied from the water supply section 3 (the reaction occurs between the raw material and steam). The reformer 1 includes a steam reforming section including an Ru-based catalyst for progressing a reforming reaction of the raw material and steam, a shift converting section including a Cu—Zn-based catalyst for causing a shift converting reaction of carbon monoxide in the hydrogen-containing gas generated by the steam reforming section and steam to reduce the concentration of carbon monoxide in the hydrogen-containing gas, an air supply section 19 for supplying air to the hydrogen-containing gas which has passed the shift converting section, and a selective oxidation section including an Ru-based catalyst for mainly oxidizing and thus removing carbon monoxide residual in the hydrogen-containing gas which has passed the shift converting section. The structures of the steam reforming section, the shift converting section and the selective oxidation section are substantially the same as general structures of such sections and will not be described.

The reformer 1 also includes a combustion section (for example, burner) 2 for combusting combustion gas acting as a heating source for supplying reactive heat necessary for the reforming reaction caused in the steam reforming section, an igniter (not shown in detail) acting as an ignition source of the combustion section 2, a frame rod (not shown in detail) for detecting a combustion state of the combustion section 2, and a combustion fan 18 for supplying combustion air to be used for combustion to the combustion section 2. The combustion gas to be combusted in the combustion section 2 is supplied to the combustion section 2 via the combustion gas supply path 15. The hydrogen-containing gas generated by the reformer 1 is supplied to the fuel cell 8 via the hydrogen gas supply path 12.

The hydrocarbon-based raw material to be supplied to the adsorptive removal section 5 may be any raw material containing an organic compound formed at least of carbon and hydrogen, such as hydrocarbon or the like, and is, for example, city gas, natural gas, LPG or the like containing methane as a main component. Herein, the gas infrastructure line 6 of the city gas is used as a supply source of the raw material, and the adsorptive removal section 5 is connected to the gas infrastructure line 6. The adsorptive removal section 5 has a shape detachable from connection sections 7 which are provided upstream and downstream with respect to the adsorptive removal section 5. When the amount of the sulfur component adsorbed by the adsorptive removal section 5 is saturated as a result of using the adsorptive removal section 5 for a certain time period and so the adsorption characteristics thereof is declined, the adsorptive removal section 5 is exchanged to a fresh adsorptive removal section. The adsorptive removal section 5 in this embodiment is filled with a zeolite-based adsorptive removal agent for adsorbing a sulfur compound, which is an odorizing component in the city gas.

The water supply section 3 in this embodiment includes a pump having a flow rate adjusting function. The raw material supply section 4 is located on a raw material supply path 10 for connecting the adsorptive removal section 5 and the reformer 1 to each other, and controls the flow rate of the raw material to be supplied to the reformer 1 to control the flow rate of the raw material to be supplied from the gas infrastructure line 6 to the adsorptive removal section 5. The raw material supply section 4 only needs to be able to control the flow rate of the raw material to be supplied to the adsorptive removal section 5, and the adsorptive removal section 5 may be located downstream with respect to the raw material supply section 4. In this embodiment, the raw material supply section 4 includes a booster pump, and, for example, can control the electric current pulse to be input, power to be input or the like and thus can adjust the flow rate of the raw material to be supplied to the adsorptive removal section 5.

An operating control section 16 is a control section for controlling the driving operation of the reformer 1 and the power generation operation of the fuel cell 8. Herein, the operating control section 16 controls the amount of the raw material to be supplied from the raw material supply section 4 to the reformer 1, the amount of water to be supplied from the water supply section 3 to the reformer 30, and the like. The operating control section 16, using a semiconductor memory, a CPU or the like, can store the driving information and the like such as a driving operation sequence of the reformer 1 and the fuel cell 8, calculate an appropriate operation condition suitable to the situation, and issue an instruction on the operation condition to structural elements necessary for the driving such as the water supply section 3, the raw material supply section 4 and the like. The operating control section 16 also has a function of calculating the operating time of the fuel cell 8, a function of calculating an accumulated flow volume of the raw material based on the electric current pulse, the input power, the operating time and the like of the raw material supply section 4 (function of an accumulated flow volume measuring section), and a function of calculating an accumulated power amount based on the amount of generated power, the operating time and the like of the fuel cell detected by the power detection section 20.

The operating control section 16 may include an input section for inputting a driving instruction signal to the reformer 1, an exchange signal for the adsorptive removal section 5 or the like. For example, the input section includes a touch panel, and a maintenance worker or a user may input a driving instruction signal or an exchange signal from the touch panel when necessary. The fuel cell power generation system 100 may further include an exchange signal output section for outputting an exchange signal for the adsorptive removal section 5 to the operating control section 16. The exchange signal may be output based on, for example, a signal which is input to the input section by the maintenance worker of the reformer 1. Alternatively, a mechanism for holding the adsorptive removal section 5 (for example, the connection sections 7) may be provided with a desulfurization section exchange detection section (a contact switch, a sensor, etc.) for detecting an exchange of the adsorptive removal section 5. When the desulfurization section exchange detection section detects an exchange, an exchange signal may be generated and output to the operating control section 16 by the exchange signal output section.

<Operation of the Fuel Cell Power Generation System in a Normal State>

Now, a driving operation on the reformer 1 during in a normal state will be described.

Before starting the fuel cell power generation system 100 from a stop state, first, valves and the like (not shown in detail) set on gas flow paths of the reformer 1 are closed where necessary to check whether there is a gas leak from each gas flow path or the like. When there is no gas leak, the reformer 1 is started. Based on an instruction from the operating control section 16, the raw material which has passed the reformer 1 is supplied to the combustion section 2 and ignited by the combustion section 2 to start heating.

At this point, the water supply section 3 is operated to supply water to the reformer 1 and thus to start a reforming reaction of water and the raw material. In this embodiment, city gas (13A) containing methane as a main component is used as the raw material. The amount of water supplied from the water supply section 3 is controlled such that the amount of steam is about 3 moles with respect to 1 mol of the carbon atoms in the average molecular formula of the city gas (steam-to-carbon ratio (S/C): about 3). In the reformer 1, the steam reforming section progresses a steam reforming reaction, the shift converting section progresses a shift converting reaction, and the selective oxidation section progresses a selective oxidation reaction of carbon monoxide. The generated hydrogen-containing gas is supplied to a fuel cell 8 via the hydrogen gas supply path 12. For example, in the case where the hydrogen-containing gas is to be supplied to a solid-state polymer-type fuel cell, the concentration of carbon monoxide in the hydrogen-containing gas is reduced to about 20 ppm or lower on the volume basis (on the dry gas basis). The operating control section 16 also controls the operation of the raw material supply section 4 such that the raw material is supplied to the adsorptive removal section 5 in a preset flow rate with respect to the amount of the hydrogen-containing gas required by the fuel cell 8 to generate power. At this point, the operation of the fuel cell air blower 17 is also controlled to supply air required by the fuel cell 8 to generate power.

By contrast, for stopping the driving of the fuel cell power generation system 100, the supply of the raw material and water to the reformer 1 is stopped and the supply of the hydrogen-containing gas to the fuel cell 8 is stopped. At the same time, the temperature of a catalyst layer of each of the steam reforming section, the shift converting section and the selective oxidation section in the reformer 1 is lowered. After the temperature of each catalyst layer is lowered to a set temperature, the raw material is supplied to the reformer 1 to replace the hydrogen-containing gas staying inside the gas path of the reformer 1 with the raw material. The hydrogen-containing gas staying inside the reformer 1 and replaced at this point is passed to the combustion section 2 and combusted.

Usable as the combustion gas to be combusted in the combustion section 2 is the raw material supplied from the gas infrastructure line 6, the hydrogen-containing gas generated in the reformer 1, hydrogen off-gas discharged from an anode of the fuel cell 8 among the hydrogen-containing gas supplied to the fuel cell 8, or the like. Such combustion gas is each sent to the combustion section 2 via the combustion gas supply path 15.

<Operation of the Fuel Cell Power Generation System when a Fresh Adsorptive Removal Section is Used>

Now, a method for driving the fuel cell power generation system 100 when a fresh adsorptive removal section 5 which has passed by almost no raw material is used will be described.

In this embodiment, a raw material flow rate is preset with respect to an amount of power to be generated by the fuel cell 8, and the operation of the raw material supply section 4 is controlled by the operating control section 16 such that the flow rate of the raw material which is to pass the adsorptive removal section 5 is decreased as the operating time of the fuel cell 8 passes. Specifically, in order to avoid the shortage of the hydrogen-containing gas in the fuel cell 8, a necessary raw material flow rate is preset with respect to an amount of power to be generated by the fuel cell 8, in consideration of the amount of the raw material which will be adsorbed by the adsorptive removal section 5. However, as the total amount of the raw material which has passed the adsorptive removal section 5 increases, the amount of the hydrocarbon component adsorbed by the adsorptive removal section 5 decreases. Therefore, if the preset raw material flow rate is kept, the amount of the hydrogen-containing gas generated by the reformer 1 becomes excessive for the amount of power to be generated by the fuel cell 8. This decreases the energy utilization efficiency. For avoiding this, the operation of the raw material supply section 4 is controlled by the operating control section 16 such that the flow rate of the raw material which is to pass the adsorptive removal section 5 is decreased as the amount of the hydrocarbon component adsorbed by the adsorptive removal section 5 decreases. Owing to this, even though the amount of the hydrocarbon component adsorbed by the adsorptive removal section 5 decreases as the accumulated amount of the raw material supplied to the adsorptive removal section 5 increases, the raw material is suppressed from being supplied in an excessive amount for the power to be generated by the fuel cell 8 to the reformer 1. As a result, the energy saving characteristic of the fuel cell power generation system can be improved.

The operating time of the fuel cell 8 and the amount of the hydrogen-containing gas consumed in the fuel cell 8, namely, the total amount of the raw material which is to pass the adsorptive removal section 5 correlate to each other. Therefore, the flow rate of the raw material which is to pass the adsorptive removal section 5 may be decreased as the operating time of the fuel cell 8 passes. This provides the same effect as above.

In this embodiment, the raw material flow rate which is preset with respect to the amount of power to be generated by the fuel cell 8 when the fuel cell 8 is driven for the first time using a fresh adsorptive removal section is preset as an initial value. It is preferable that the preset value is determined so as to compensate for the amount of the raw material decreased by being adsorbed by the adsorptive removal section 5, based on the adsorption characteristics of the adsorptive removal section 5 on the hydrocarbon component obtained by the measurement as described above with reference to FIG. 1. As the operating time of the fuel cell 8 passes, the flow rate of the raw material which is to pass the adsorptive removal section 5 is decreased. The amount to be decreased may also be preset based on the adsorption characteristics of the adsorptive removal section 5.

Hereinafter, this will be specifically described as being applied to the fuel cell power generation system 100 in this embodiment.

In a fresh adsorptive removal section 5 which has been passed by almost no raw material, the raw material flow rate needs to be increased by about 20% in order to certainly obtain the hydrogen-containing gas in an amount necessary for power generation of 1 kW based on the above-described measurement results. Therefore, the raw material flow rate at the start of driving is set to 4.8 NL/min. After the driving starts, the amount of the hydrocarbon component adsorbed by the adsorptive removal section 5 decreases as the operating time passes. Therefore, as the operating time passes, the raw material flow rate is decreased from 4.8 NL/min. For example, at the time when about 240 L of the raw material has passed the adsorptive removal section 5 since the start of driving (accumulated flow volume: about 240 L), it is sufficient that the raw material flow rate is increased by about 10% in order to certainly obtain the hydrogen-containing gas in an amount necessary for power generation of 1 kW based on the above-described measurement results. The raw material flow rate preset at the start of driving is too large. Therefore, the raw material flow rate is controlled to be 4.4 NL/min., which is minus 10% from the raw material flow rate at the start of driving. In the case where the raw material flow rate is decreased stepwise, it is acceptable that the total amount of the raw material decreased up to the above-mentioned point is 10%.

In the final state, as shown in FIG. 1, the amount of the hydrocarbon component adsorbed by the adsorptive removal section 5 is saturated as a result of a prescribed amount of the raw material having passed the adsorptive removal section 5. Namely, after the reformer 1 is driven after the adsorptive removal section 5 is exchanged and the raw material is caused to flow to the adsorptive removal section 5 for a certain time period, the amount of the hydrocarbon component adsorbed by the adsorptive removal section 5 becomes small and thus the flow rate of the raw material which has passed the adsorptive removal section 5 is stabilized. In other words, in the state where the hydrocarbon component in the raw material is not adsorbed anymore almost at all, where the target value of power generation by the fuel cell 8 is 1 kW, the raw material flow rate is the flow rate in the normal state, for example, 4 NL/min. After this point, it is not necessary anymore to perform the driving for the purpose of decreasing the flow rate of the raw material passing the adsorptive removal section 5 (here, factors for increasing or decreasing the raw material flow rate other than use of the fresh adsorptive removal section 5 are not considered). The "raw material flow rate in the normal state" is the flow rate which is set in accordance with the target value of power generation by the fuel cell power generation system after the adsorption of the hydrocarbon component by the adsorptive removal section 5 is saturated.

In this example, the raw material flow rate is set when the accumulated flow volume is about 240 L. Similarly, the value of the raw material flow rate with respect to the target value of power generation immediately after the adsorptive removal section 5 is exchanged, or when the accumulated flow volume is not about 240 L, can also be appropriately set based on the measurement results of the amount of the raw material adsorbed by the adsorptive removal section 5. The raw material flow rate may be decreased in the following manner. For example, several target points may be set for the accumulated raw material flow rate, and each time one of such target points is reached, the raw material flow rate may be decreased at a prescribed ratio. Alternatively, the relationship between the accumulated raw material flow rate and the amount of the raw material adsorbed by the adsorptive removal section 5 may be put into a function and the raw material flow rate may be decreased in accordance with the function.

In this embodiment, there is no specific limitation on the zeolite-based adsorbing desulfurization agent to be contained in the adsorptive removal section 5, but the adsorption characteristics on the hydrocarbon component in the raw material varies in accordance with the type of the zeolite-based agent. Thus, when the adsorptive removal section 5 with a different type of zeolite-based adsorbing desulfurization agent is to be used, it is preferable to measure the adsorption characteristics of the adsorptive removal section 5 on the hydrocarbon component in advance by, for example, substantially the same method as described above and control the raw material flow rate based on the obtained adsorption characteristics. It is advantageous to set the driving condition of the reformer 1 immediately after the adsorptive removal section 5 is exchanged for each adsorbing desulfurization agent to be used, because in this way, the amount of the hydrocarbon component adsorbed by the adsorbing desulfurization agent can be compensated for more certainly.

It is desirable that the raw material flow rate is an amount which completely compensates for the hydrocarbon component adsorbed by the adsorptive removal section 5, but may be larger or smaller than such an amount. An amount of the generated hydrogen-containing gas slightly deviated from the set value is acceptable as long as the deviation is within a range in which the fuel cell 8 is driven stably. The raw material flow rate may be determined within such a range.

In this embodiment, it is sufficient that the flow rate of the raw material which is to pass the adsorptive removal section is decreased as the accumulated operating time of the fuel cell increases, for a certain time period after the start of driving of the system. The accumulated operating time may be measured and the raw material flow rate may be controlled based on the measured value. Alternatively, instead of measuring the accumulated operating time, another parameter correlated with the accumulated operating time may be measured.

For example, the accumulated flow volume of the raw material which has passed the adsorptive removal section 5 may be measured, and the flow rate of the raw material which is to pass the adsorptive removal section 5 may be decreased based on the measured value. The accumulated flow volume of the raw material supplied to the adsorptive removal section 5 is measured by an accumulated flow volume measuring section including a dry- or wet-type accumulated flow meter. In this case, the operating control section 16 controls an operation of the accumulated flow volume measuring section to start a measurement of the accumulated flow volume. Preferably, when the measured accumulated flow volume reaches a preset value, the operating control section 16 controls the raw material supply section 4 to return the raw material flow rate to the material flow rate in the normal state. The accumulated flow volume measuring section may be structured to calculate an accumulated flow volume based on the raw material flow rate and the operating time. The raw material flow rate may be directly measured using a flow meter or estimated from an operation indication value (input power or input frequency) of the raw material supply section 4.

Alternatively, the accumulated power amount of the fuel cell 8 may be measured by an accumulated power amount measuring section, and the raw material flow rate which is to pass the adsorptive removal section 5 may be decreased based on the measured value of the accumulated power amount. For example, the fuel cell power generation system 100 may be structured such that the power detection section 20 detects the amount of power generated by the fuel cell 8 and the operating control section calculates the accumulated flow volume based on the amount of generated power and the operating time.

Figure 4:
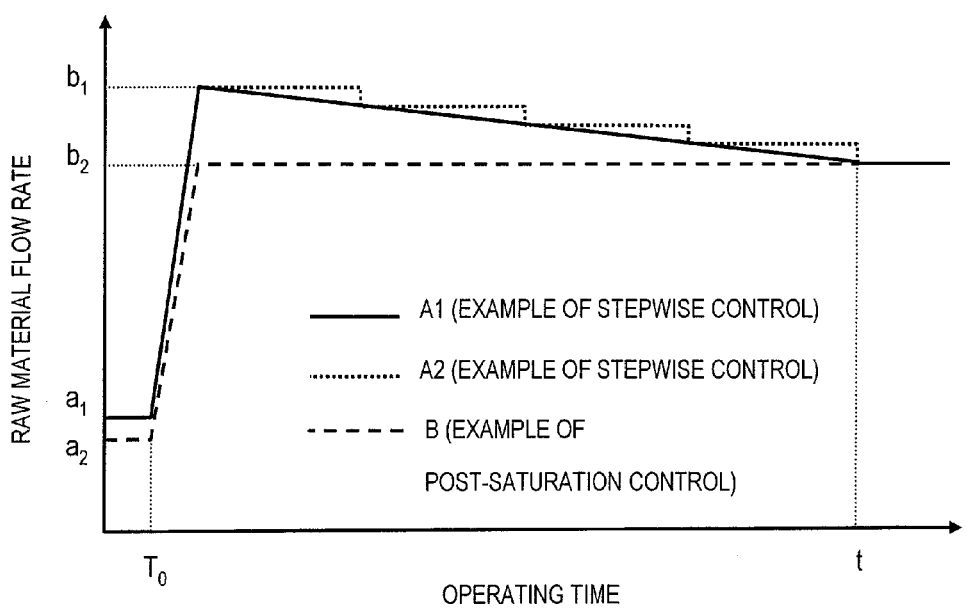
FIG. 4 is a schematic view of a control pattern on a raw material flow rate according to the present invention.

FIG. 4 is a graph showing an example of a control pattern on the raw material flow rate in the fuel cell power generation system in this embodiment. The horizontal axis shows the time from when the system starts to be driven (operating time) T, and the vertical axis shows the raw material flow rate. In FIG. 4, examples A1 and A2 each show a time-wise change of the raw material flow rate when the system starts to be driven for the first time using a fresh adsorptive removal section.

As shown in FIG. 4, during a time period after the driving is started until a prescribed power (for example, 300 W) is output ($0 \leq T < T_0$; hereinafter, referred to as the "starting time period"), the raw material flow rate is suppressed to $a_1$ in order to adjust the temperature rise of the reformer. When the prescribed power is output ($T \geq T_0$), the raw material flow rate is increased to $b_1$, which is necessary to obtain the target value of power generation (for example, 1 kW). Flow rate $b_1$ is a preset value based on the amount of power to be generated and the adsorption characteristics of the adsorptive removal section. With example A1 shown here, the raw material flow rate is linearly decreased from $b_1$ to $b_2$ until the operating time T reaches a prescribed time period t. Raw material flow rate $b_2$ at the time when the operating time T=t is the raw material flow rate in the normal state described above.

With example A1, the raw material flow rate during the starting time period is generally constant at $a_1$ and the raw material flow rate after the adsorption of the hydrocarbon component by the adsorptive removal section is saturated (after the operating time reaches T=t) is generally constant at $b_2$. In actuality, however, complicated controls are performed to respond to a change of output or the like, and therefore the above raw material flow rates may not occasionally be generally constant. With example A1, the raw material flow rate is linearly decreased. Alternatively, as with example A2, the raw material flow rate may be decreased down to $b_2$ stepwise. Meanwhile, in the case where the system is driven after the adsorption of the hydrocarbon component by the adsorptive removal section is saturated, the raw material flow rate is controlled as shown by example B to be $a_2$ ($a_2 < a_1$) during the starting time period and to be $b_2$ after a prescribed amount of power is output ($T \geq T_0$).

Figure 5:
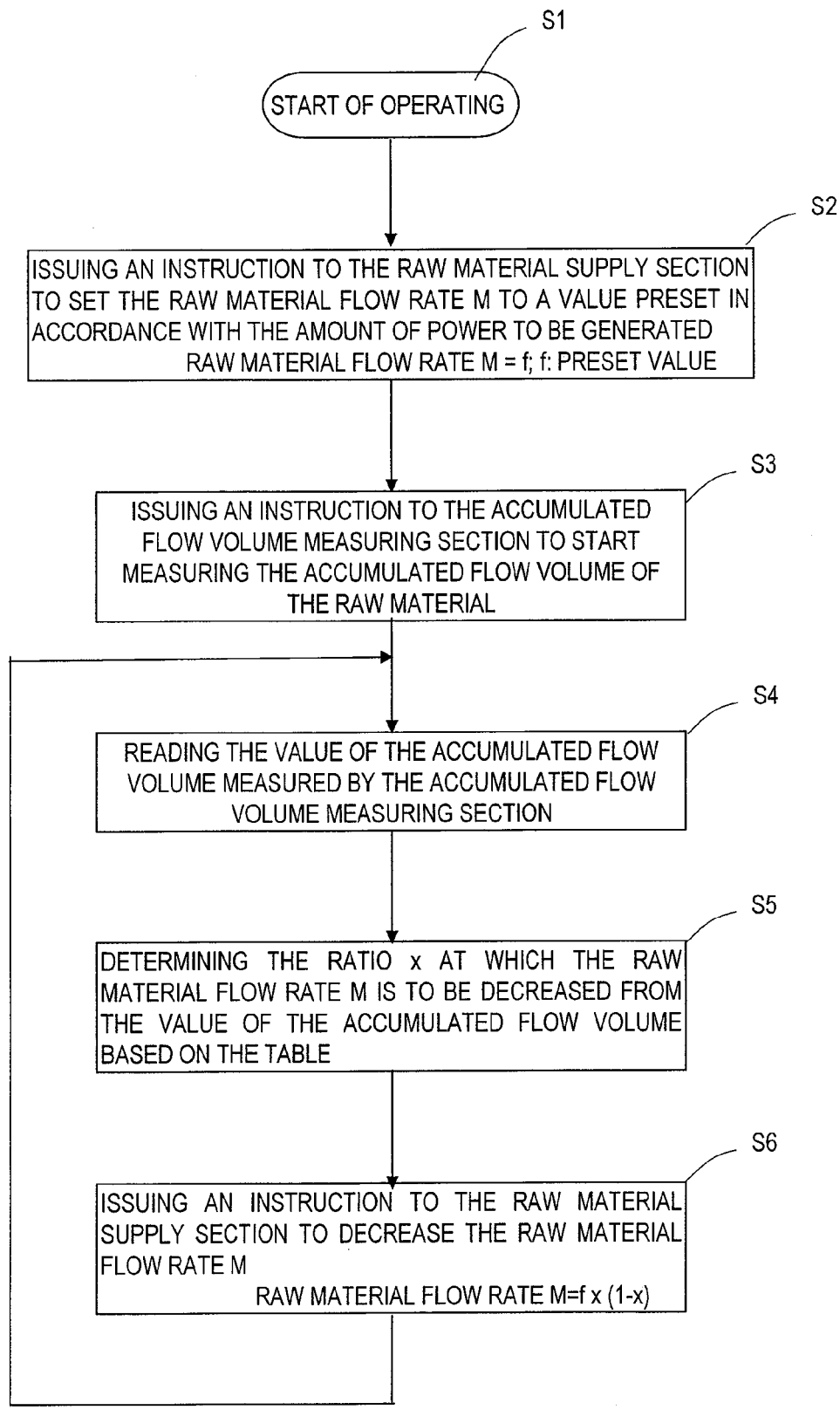
FIG. 5 shows an example of a control method performed by an operating control section in Embodiment 1 of the present invention.

Now, a control method executed by the operating control section will be described specifically. FIG. 5 is a flowchart showing an example of the control method. In this example, the ratio of the raw material flow rate with respect to the target value of power generation is adjusted by issuing an instruction to the raw material supply section and thus controlling the raw material flow rate.

First, a fresh adsorptive removal section is installed and the system starts to be driven (step S1). At this point, an instruction is issued to the raw material supply section to set the raw material flow rate M to a preset flow rate f (step S2). Next, the accumulated flow volume measuring section located, for example, upstream with respect to the adsorptive removal section is reset to start measuring the accumulated flow volume of the raw material supplied to the adsorptive removal section (step S3). Step S3 may be performed before step S2 or concurrently with step S2. Next, the value of the accumulated flow volume measured by the accumulated flow volume measuring section is read (step S4). Herein, step S4 is executed, for example, every 5 minutes, and each time, the ratio x of the amount by which the raw material flow rate is to be decreased from the preset flow rate f is determined based on the value of the accumulated flow volume read in step S4 (step S5). An instruction is issued to the raw material supply section to decrease the raw material flow rate (step S6). At this point, the raw material flow rate is f×(1−x). After this, step 4 is executed again. The ratio x is set to be constant after the value of the accumulated flow volume read in step S4 reaches a prescribed accumulated flow volume (value set based on the flow volume for saturation adsorption).

With the above-described control method, the value of the accumulated flow volume is read at a prescribed timing, and the ratio by which the raw material flow rate is to be decreased is updated based on the value. Therefore, even where the amount of the hydrocarbon component adsorbed by the adsorptive removal section is decreased, an optimal amount of the raw material can be supplied to the reformer.

INDUSTRIAL APPLICABILITY

According to the present invention, when a fresh adsorptive removal section is used, the flow rate of the raw material to be supplied to the hydrogen generation section is suppressed from becoming excessive even when the accumulated amount of the raw material supplied to the adsorptive removal section increases, which improves the energy saving characteristic. The present invention is useful as a home-use fuel cell power generation system or the like.

REFERENCE SIGNS LIST

1 Reformer
2 Combustion section
3 Water supply section
4 Raw material supply section
5 Adsorptive removal section
6 Gas infrastructure line
7 Connection section
8 Fuel cell
9 Gas switching section
10 Raw material supply path
11 Reformer bypass path
12 Hydrogen gas supply path
13 Fuel cell bypass path
14 Off-gas path
15 Combustion gas supply path
16 Operating control section
17 Fuel cell air blower
18 Combustion fan
19 Air supply section
20 Power detection section
100 Fuel cell power generation system

The invention claimed is:

1. A fuel cell power generation system for performing power generation using hydrogen-containing gas generated from a raw material containing a hydrocarbon component and an odorizer component, the fuel cell power generation system comprising:
a raw material supply section configured to control a flow rate of the raw material;
a water supply section configured to supply water;
an adsorptive removal section configured to cause the raw material to pass therethrough and adsorb the odorizer component contained in the raw material;
a reformer configured to generate the hydrogen-containing gas by a reforming reaction of the raw material which has passed the adsorptive removal section and water supplied from the water supply section;
a fuel cell configured to perform power generation using the hydrogen-containing gas as a fuel;
an accumulated flow volume measuring section configured to measure an accumulated flow volume of the raw material supplied to the adsorptive removal section from the raw material supply section; and
a controller including a processor and a memory storing a program,
wherein the program, when executed by the processor, causes the controller to perform operations including: as the accumulated flow volume of the raw material measured by the accumulated flow volume measuring section increases, decreasing the flow rate of the raw material to be supplied to the adsorptive removal section from the raw material supply section, the flow rate being set with respect to an amount of power to be generated by the fuel cell when the fuel cell generates power.

2. The fuel cell power generation system of claim 1, the accumulated flow volume measuring section including an accumulated power amount measuring section configured to measure an accumulated amount of power generated by the fuel cell; wherein the operating control section decreases the flow rate of the raw material which is set with respect to the amount of power to be generated by the fuel cell as the accumulated amount of power generated by the fuel cell measured by the accumulated power amount measuring section increases.

3. The fuel cell power generation system of claim 1, wherein the operating control section decreases, stepwise, the flow rate of the raw material which is set with respect to the amount of power to be generated by the fuel cell.

4. The fuel cell power generation system of claim 1, wherein an amount by which the flow rate of the raw material is to be decreased is defined based on adsorption characteristics of the adsorptive removal section on the hydrocarbon component.

5. The fuel cell power generation system of claim 1, wherein the adsorptive removal section has an adsorptive removal agent containing zeolite as a main component.

6. A method for driving a fuel cell power generation system for performing power generation using hydrogen-containing gas generated from a raw material containing a hydrocarbon component and an odorizer component, wherein:
the fuel cell power generation system comprises:
a raw material supply section configured to control a flow rate of the raw material;
a water supply section configured to supply water;
an adsorptive removal section configured to cause the raw material to pass therethrough and adsorb the odorizer component contained in the raw material;
a reformer configured to generate the hydrogen-containing gas by a reforming reaction of the raw material which has passed the adsorptive removal section and water supplied from the water supply section; and
a fuel cell configured to perform power generation using the hydrogen-containing gas as a fuel; and
the method comprising the steps of:
measuring an accumulated flow volume of the raw material supplied to the adsorptive removal section from the raw material supply section; and
decreasing the flow rate of the raw material to be supplied to the adsorptive removal section from the raw material supply section as the measured accumulated flow volume of the raw material increases, the flow rate being set with respect to an amount of power to be generated by the fuel cell when the fuel cell generates power.

7. The method for driving the fuel cell power generation system of claim 6, wherein, in the measuring step, the accumulated flow volume of the raw material is measured indirectly by measuring an operating time of the fuel cell power generation system and, in the decreasing step, the flow rate of the raw material which is set with respect to the amount of power to be generated by the fuel cell is decreased as the measured operating time of the fuel cell power generation system passes.

8. The method for driving the fuel cell power generation system of claim 6, wherein, in the measuring step, the accumulated flow volume of the raw material is measured indirectly by measuring an accumulated amount of power generated by the fuel cell and, in the decreasing step, the flow rate of the raw material which is set with respect to the amount of power to be generated by the fuel cell is decreased as the measured accumulated amount of power generated by the fuel cell increases.

9. The method for driving the fuel cell power generation system of claim 6, wherein, in the decreasing step, the flow rate of the raw material which is set with respect to the amount of power to be generated by the fuel cell is decreased stepwise.

10. The method for driving the fuel cell power generation system of claim 6, wherein, in the decreasing step, an amount by which the flow rate of the raw material is to be decreased is defined based on adsorption characteristics of the adsorptive removal section on the hydrocarbon component.

* * * * *